US007777737B2

(12) United States Patent
Akutsu et al.

(10) Patent No.: US 7,777,737 B2
(45) Date of Patent: Aug. 17, 2010

(54) ACTIVE MATRIX TYPE LIQUID CRYSTAL DISPLAY DEVICE

(75) Inventors: Hikaru Akutsu, Gifu (JP); Yusuke Tsutsui, Gifu (JP); Makoto Kitagawa, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1123 days.

(21) Appl. No.: 11/287,478

(22) Filed: Nov. 28, 2005

(65) Prior Publication Data

US 2006/0208992 A1 Sep. 21, 2006

(30) Foreign Application Priority Data

Nov. 26, 2004 (JP) ............................ 2004-342366

(51) Int. Cl.
*G06F 3/038* (2006.01)
*G09G 5/00* (2006.01)
*G09G 3/36* (2006.01)

(52) U.S. Cl. .......................... 345/209; 345/87; 345/96; 345/98; 345/208

(58) Field of Classification Search .................. 345/96, 345/98, 209
See application file for complete search history.

(56) References Cited

U.S. PATENT DOCUMENTS

2001/0052887 A1* 12/2001 Tsutsui et al. ................. 345/87
2002/0186191 A1* 12/2002 Ikeda et al. .................... 345/87
2002/0196241 A1* 12/2002 Morita ........................ 345/204
2004/0160404 A1* 8/2004 Nakajima et al. ............. 345/96

FOREIGN PATENT DOCUMENTS

JP 2000-81606 A 3/2000
JP 2003-150127 A 5/2003
JP 2003150127 A * 5/2003
JP 2004-12890 A 1/2004

* cited by examiner

*Primary Examiner*—Bipin Shalwala
*Assistant Examiner*—Ilana Spar
(74) *Attorney, Agent, or Firm*—Morrison & Foerster LLP

(57) ABSTRACT

Power consumption in an active matrix type liquid crystal display device having partial display function is reduced. In one frame period, a display area corresponding to first 80 horizontal periods, that is the first line through the 80th line, is set as a partial display area and a display area corresponding to the remaining 239 lines is set as a background display area. And a partial display area control signal ENBSC is set at a low level and an SC inversion drive is performed in the partial display area. The partial display area control signal ENBSC is fixed at a high level in the background display area and all of SC inversion control units corresponding to the background display area halt their operation.

8 Claims, 8 Drawing Sheets

FIG.6A Electric Potentials in Pixel GS11
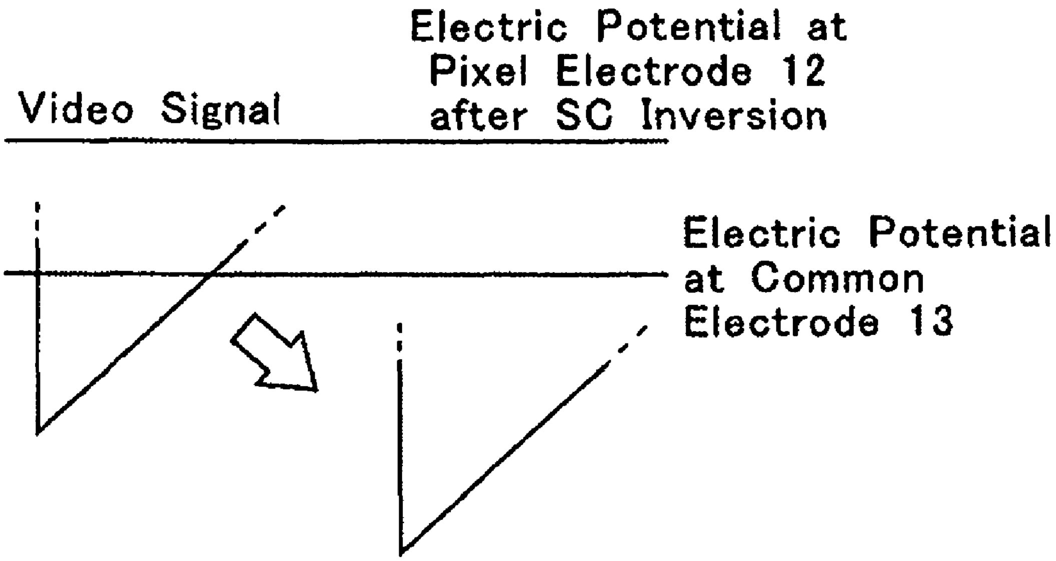
FIG.6B Electric Potentials in Pixel GS12
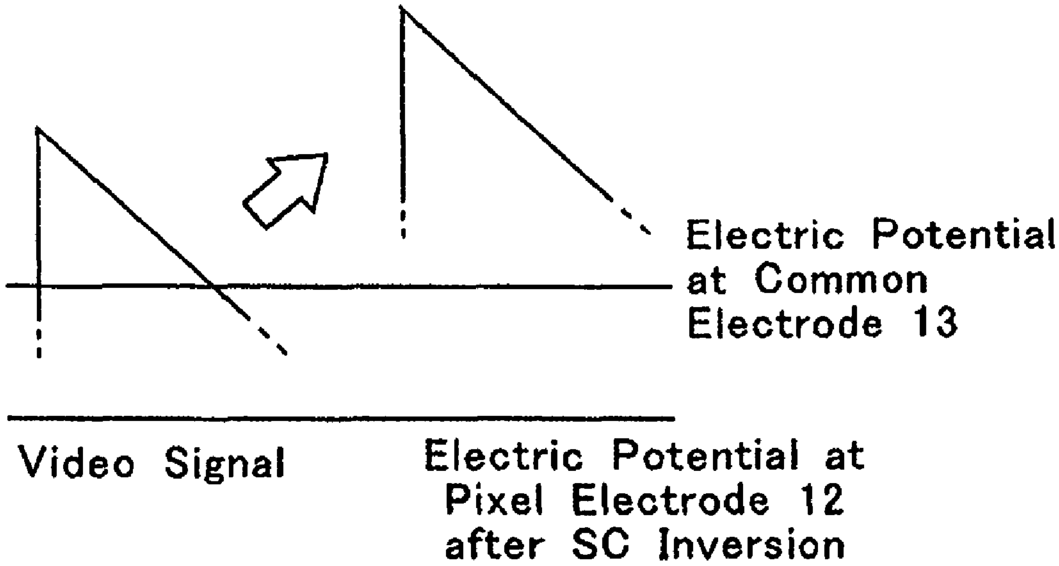

ACTIVE MATRIX TYPE LIQUID CRYSTAL DISPLAY DEVICE

CROSS-REFERENCE OF THE INVENTION

This invention is based on Japanese Patent Application No. 2004-342366, the content of which is incorporated herein by reference in its entirety.

BACKGROUND OF THE INVENTION

1. Field of the Invention

This invention relates to an active matrix type liquid crystal display device, specifically to an active matrix type liquid display device having a partial display function and an auxiliary capacitor line inversion drive function.

2. Description of the Related Art

In the active matrix type liquid crystal display device in which a pixel electrode of each pixel is provided with a video signal through a switching device such as a TFT (Thin Film Transistor), deterioration of a liquid crystal has been prevented by common electrode AC driving, that is, applying alternating electric potential to auxiliary capacitors and a common electrode that is facing the pixel electrodes.

However, capacitive load arising from the common electrode and all auxiliary capacitor lines and power consumption due to them remain large, since the common electrode AC driving in which the polarity of the video signal provided to each drain line is inverted once every horizontal period requires inverting the polarity of the electric potential at the common electrode and all the auxiliary capacitor lines once every horizontal period.

Japanese Patent Application Publication No. H12-81606 discloses a driving method to reduce power consumption of a horizontal drive circuit by inverting the polarity of the electric potential at the auxiliary capacitor lines at a constant interval while keeping the electric potential at the common electrode constant so as to reduce potential difference between the positive polarity and the negative polarity of the video signal in order to realize further low power consumption. The method is hereafter referred to as SC inversion driving which is a short form for an auxiliary capacitor line inversion driving method.

Japanese Patent Application Publication No. 2003-150127 discloses a dot inversion driving method in which voltages of different polarities are applied to pixel electrodes adjacent to each other in a direction of a gate line so that the pixels adjacent to each other in horizontal and vertical directions are applied voltages of different polarities as shown in FIG. 8, in order to prevent capacitive coupling caused in the SC inversion driving and resulting variations in a picture.

On the other hand, Japanese Patent Application Publication No. 2004-12890 discloses an active matrix type liquid crystal display device having a partial display function that performs a partial display at a time of power saving by providing pixels only in a partial display area selected from a liquid crystal display area with a desired video signal through the switching devices and providing pixels in the rest of the display area, that is defined as a background display area, with a white signal or a black signal through the switching devices.

This invention is directed to reduce the power consumption of the active matrix type liquid crystal display device using the SC inversion driving as described above when it performs the partial display function.

SUMMARY OF THE INVENTION

The invention provides an active matrix type liquid crystal display device configured to operate under a normal display mode and a partial display mode. The device includes a plurality of pixels arranged in a matrix form having rows and columns, a pixel electrode disposed in each of the pixels, a common electrode, a liquid crystal layer disposed between the common electrode and the pixel electrodes, a switching device disposed in each of the pixels, receiving a gate signal and connected with a corresponding pixel electrode, a vertical drive circuit outputting the gate signals to the switching devices based on a vertical clock, a first auxiliary capacitor line and a second auxiliary capacitor line that are disposed along each row of the matrix, an auxiliary capacitor line inversion drive circuit that performs an inversion drive to invert electric potentials at the first and second auxiliary capacitor lines at a predetermined interval so that the electric potentials at the first and second auxiliary capacitor lines are opposite in phase to each other, and a plurality of first auxiliary capacitors connected with the first auxiliary capacitor line and a plurality of second auxiliary capacitors connected with the second auxiliary capacitor line. Each of the pixel electrodes is connected with one of the first auxiliary capacitors or one of the second auxiliary capacitors. The device also includes a horizontal drive circuit that under the partial display mode provides each of pixels selected according to a partial display area control signal with an image signal that is supplied to a corresponding pixel electrode through a corresponding switching device. Under the partial display mode the auxiliary capacitor line inversion drive circuit is configured to perform the inversion drive for the selected pixels and halt the inversion drive for pixels not selected by the partial display area control signal.

BRIEF DESCRIPTION OF THE DRAWINGS

FIGS. 6A and 6B show changes in electric potentials at pixels due to the SC inversion driving in the active matrix type liquid crystal display device according to the embodiment of this invention.

DETAILED DESCRIPTION OF THE INVENTION

Figure 1:
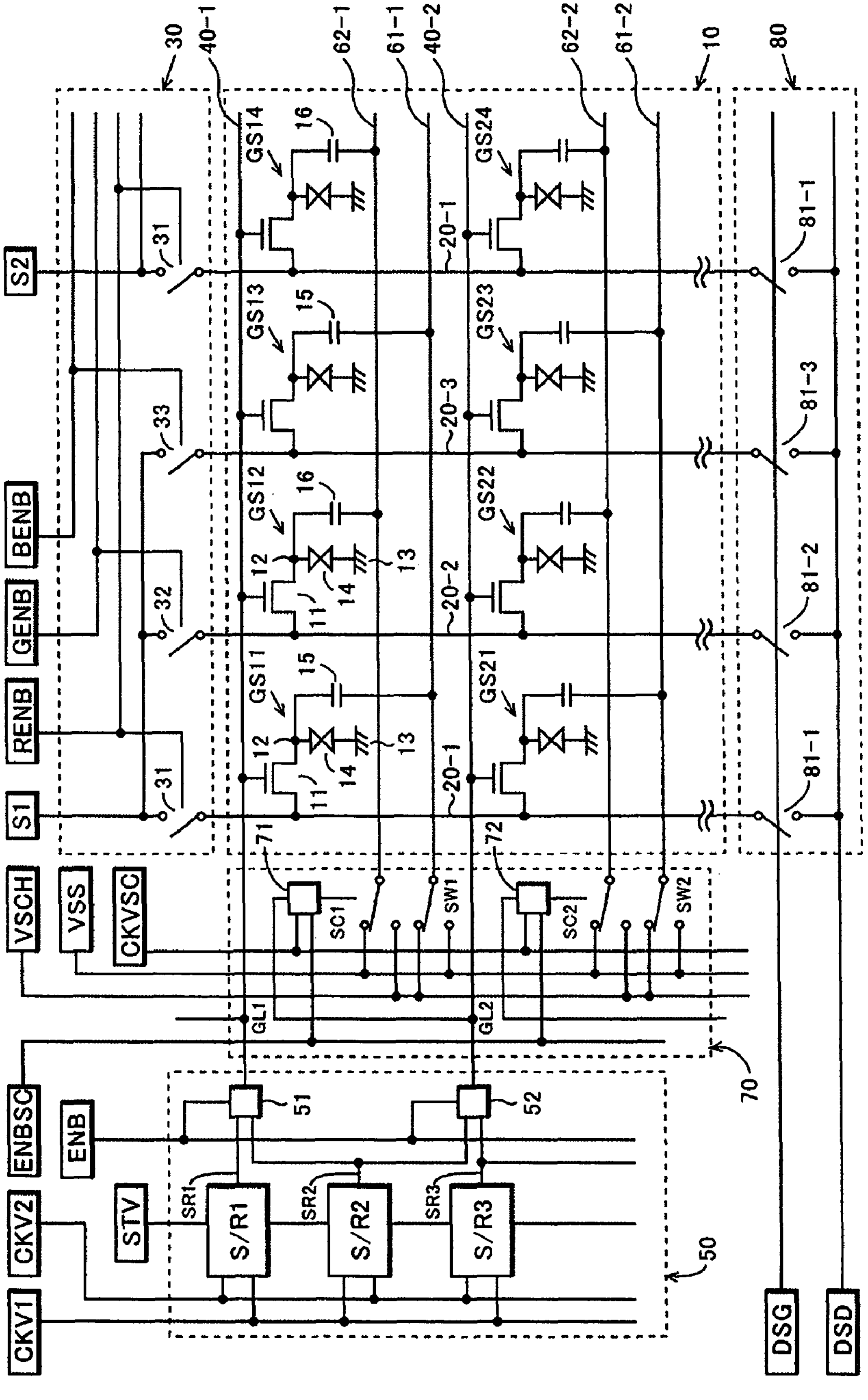
FIG. 1 is a circuit diagram showing an active matrix type liquid crystal display device according to an embodiment of this invention.

Next, an active matrix type liquid crystal display device according to an embodiment of this invention will be described hereafter, referring to the drawings. FIG. 1 is a circuit diagram showing the active matrix type liquid crystal display device.

The active matrix type liquid crystal display device includes a display area 10 made of a plurality of pixels GS11, GS12, . . . disposed on a glass substrate in a matrix form, a horizontal drive circuit 30 that outputs video signals to drain lines 20-1, 20-2, . . . each connected with a drain of a switching TFT 11 in each of the pixels arrayed in a column direction, a vertical drive circuit 50 that outputs gate signals to gate lines 40-1, 40-2, . . . each connected with a gate of a switching TFT 11 in each of the pixels arrayed in a row direction, an auxiliary capacitor line inversion drive circuit (hereafter referred to as an SC inversion drive circuit) 70 that drives a first auxiliary capacitor line 61-1 and a second auxiliary capacitor line 62-1 extending in the row direction corresponding to each row of the pixels so that electric potentials at the first and the second auxiliary capacitor lines 61-1 and 62-1 are opposite in phase to each other and a pre-charge circuit 80 that provides drain lines 20-1, 20-2, . . . with a pre-charge signal.

A structure of each of the circuits described above will be explained hereinafter in detail. First, in a first row in the display area 10, an array of a red pixel, a green pixel and a blue pixel is disposed and repeated in a row direction, in an order of red, green and blue, such as a red pixel GS11, a green pixel GS12, a blue pixel GS13, a red pixel GS14 and so on. Similarly, in a second row, an array of a red pixel, a green pixel and a blue pixel is disposed and repeated in a row direction, in the order of red, green and blue, such as a red pixel GS21, a green pixel GS22, a blue pixel GS23, a red pixel GS24 and so on.

In the pixel GS11, for example, there are provided the switching TFT the gate of which is connected with the gate line 40-1, a pixel electrode 12 connected with a source of the switching TFT 11, a liquid crystal 14 sealed between the pixel electrode 12 and a common electrode 13 and a first auxiliary capacitor 15 connected between the pixel electrode 12 and the first auxiliary capacitor line 61-1. The pixel GS12 adjacent the pixel GS11 is structured similarly except that there is provided a second auxiliary capacitor 16 connected between the pixel electrode 12 and the second auxiliary capacitor line 62-1 instead of the first auxiliary capacitor 15.

And in the pixel GS13 adjacent the pixel GS12, there is provided the first auxiliary capacitor 15 connected between the pixel electrode 12 and the first auxiliary capacitor line 61-1. That is, the auxiliary capacitor in each pixel is connected with either of the first auxiliary capacitor line 61-1 and the second auxiliary capacitor line 62-1 alternately in order to make the dot inversion driving possible.

The horizontal drive circuit 30 is provided with signal lines S1, S2, . . . , a first video switch 31, a second video switch 32 and a third video switch 33 to selectively output the video signals from the signal lines S1, S2, . . . to the drain lines 20-1, 20-2, . . . .

For example, when a red video signal enable signal RENB becomes a high level, the first video switch 31 is turned on and the red video signal is outputted from the signal lines S1, S2, . . . to the drain line 20-1 in synchronization with it. Next, when a green video signal enable signal GENB becomes a high level, the second video switch 32 is turned on and the green video signal is outputted from the signal lines S1, S2, . . . to the drain line 20-2 in synchronization with it. Next, when a blue video signal enable signal BENB becomes a high level, the third video switch 33 is turned on and the blue video signal is outputted from the signal lines S1, S2, . . . to the drain line 20-3 in synchronization with it.

The horizontal drive circuit 30 provides each of the pixels in a partial display area selected, according to a partial display area control signal ENBSC, from the display area 10 composed of the plurality of pixels with the video signal. The partial display area control signal ENBSC is a control signal to specify the partial display area, and is supplied from a driver IC (not shown) that has received an external input. A period during which the partial display area control signal ENBSC is at a low level corresponds to the partial display area, while a period during which the partial display area control signal ENBSC is at a high level corresponds to a background display area.

The vertical drive circuit 50 outputs the gate signals GL1, GL2, . . . sequentially to the gate lines 40-1, 40-2, . . . . The vertical drive circuit 50 is provided with a shift register composed of a plurality of shift register units S/R1, S/R2, S/R3, . . . . The shift register sequentially transfers a vertical start signal STV inputted to the first shift register unit S/R1 at its first stage, based on vertical clocks CKV1 and CKV2. CKV2 is a reverse clock of CKV1.

There is provided a first AND circuit 51 to which an output of the first shift register unit S/R1, an output of the second shift register unit S/R2 and an output enable signal ENB are inputted. The first AND circuit 51 outputs the first gate signal GL1 to the first row gate line 40-1.

Also, there is provided a second AND circuit 52 to which an output of the second shift register unit S/R2, an output of the third shift register unit S/R3 and the output enable signal ENB are inputted. The second AND circuit 52 outputs the second gate signal GL2 to the second row gate line 40-2. The output enable signal ENB is a clock that falls to a low level once every half period of the vertical clock CKV1, and serves as a signal to prevent the gate signals GL1 and GL2, for example, outputted to adjacent gate lines from overlapping with each other to avoid interference between them. The SC inversion drive circuit 70 is provided with SC inversion control units 71, 72, . . . , each of which is provided corresponding to each of the rows and outputs each of inversion control signals SC1, SC2, . . . to invert electric potentials at the first and the second auxiliary capacitor lines 61 and 62 in corresponding each of the rows, respectively.

And each of the inversion control signals SC1, SC2, . . . controls each of switches SW1, SW2, . . . provided corresponding to each of the rows, respectively. The SC inversion control unit 71 corresponding to the first row outputs the inversion control signal SC1 based on a SC reference signal CKVSC that repeats inversion in a cycle of one frame period, the partial display area control signal ENBSC and the second gate signal GL2. The inversion control signal SC1 repeats inversion in a cycle of one frame period in synchronization with a rise of the second gate signal GL2.

For example, when the inversion control signal SC1 is turned into a high level, the electric potential at the first auxiliary capacitor line 61-1 is turned into a low level (VSS) and the electric potential at the second auxiliary capacitor line 62-1 is turned into a high level (VSCH) by the switch SW1. When the inversion control signal SC1 is turned into a low level, on the other hand, the electric potential at the first auxiliary capacitor line 61-1 is inverted to the high level (VSCH) and the electric potential at the second auxiliary capacitor line 62-1 is inverted to the low level (VSS) by the switch SW1.

As described above, this embodiment reduces the power consumption by performing the inversion drive with the SC inversion drive circuit 70 only in the partial display area selected from the display area 10 according to the partial display area control signal ENBSC, and halting the inversion drive in the background display area. That is, the inversion drive with the SC inversion drive circuit 70 is performed only in the partial display area where the partial display area control signal ENBSC is at the low level.

And the inversion drive with the SC inversion drive circuit 70 is halted in the background display area where the partial display area control signal ENBSC is at the high level. When the inversion drive with the SC inversion drive circuit 70 is halted, the inversion control signal corresponding to the background display area is kept constant, thus each of the first auxiliary capacitor line 61 and the second auxiliary capacitor line 62 corresponding to the background display area is kept at a constant electric potential of the high level or the low level.

The pre-charge circuit 80 is provided with pre-charge switches 81-1, 81-2, 81-3, . . . that output a pre-charge signal DSD to the drain lines 20-1, 20-2, 20-3, . . . according to a pre-charge control signal DSG. The pre-charge switches 81-1, 81-2, 81-3, . . . are turned on before the video signals from the horizontal drive circuit 30 are written into the pixels. Thus the drain lines 20-1, 20-2, 20-3, . . . are set at a level of the pre-charge signal DSD. The pre-charge signal DSD is utilized as a background display signal in this embodiment, and is written into each pixel in the background display area through the switching TFT 11.

Figure 2A:
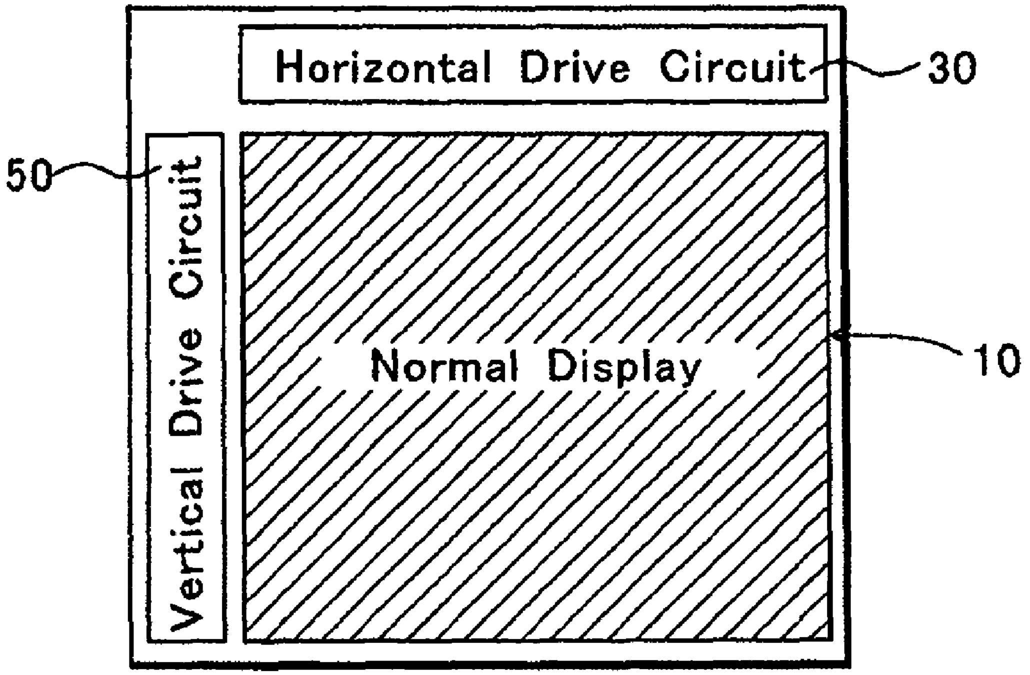
FIGS. 2A and 2B show display modes in the active matrix type liquid crystal display device according to the embodiment of this invention.
Figure 2B:
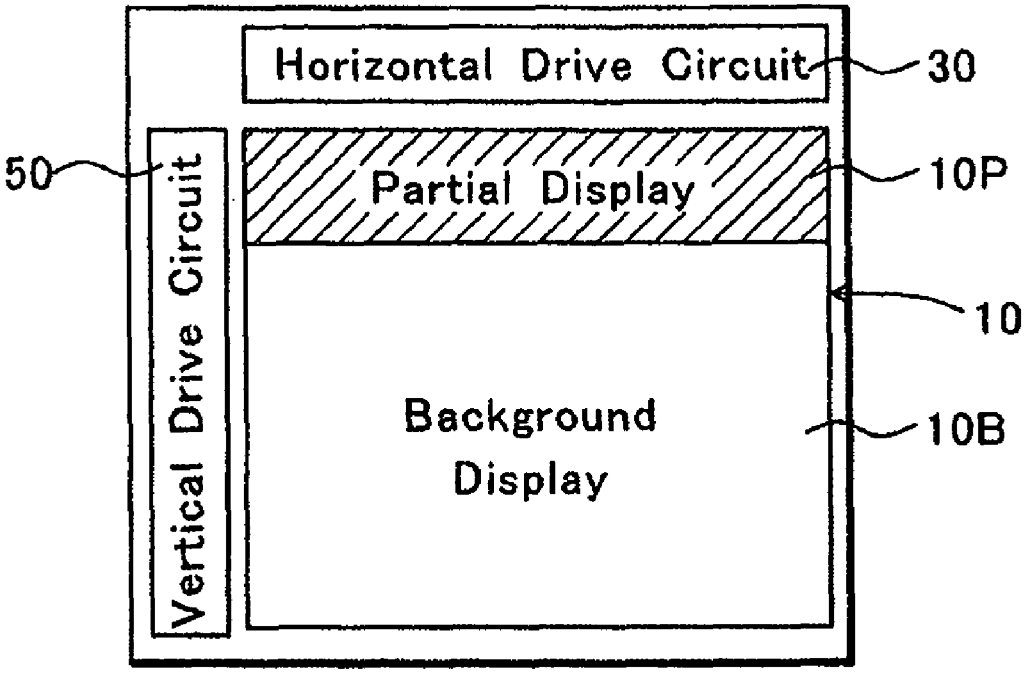

Next, operation of the active matrix type liquid crystal display device structured as described above will be explained in detail. First, the operation in the case where the SC inversion drive is performed is explained. The operation accompanied by the SC inversion drive takes place when a normal display is performed on all of the display area 10 as shown in FIG. 2A and when the partial display is performed only on the partial display area 10P as shown in FIG. 2B.

Figure 3:
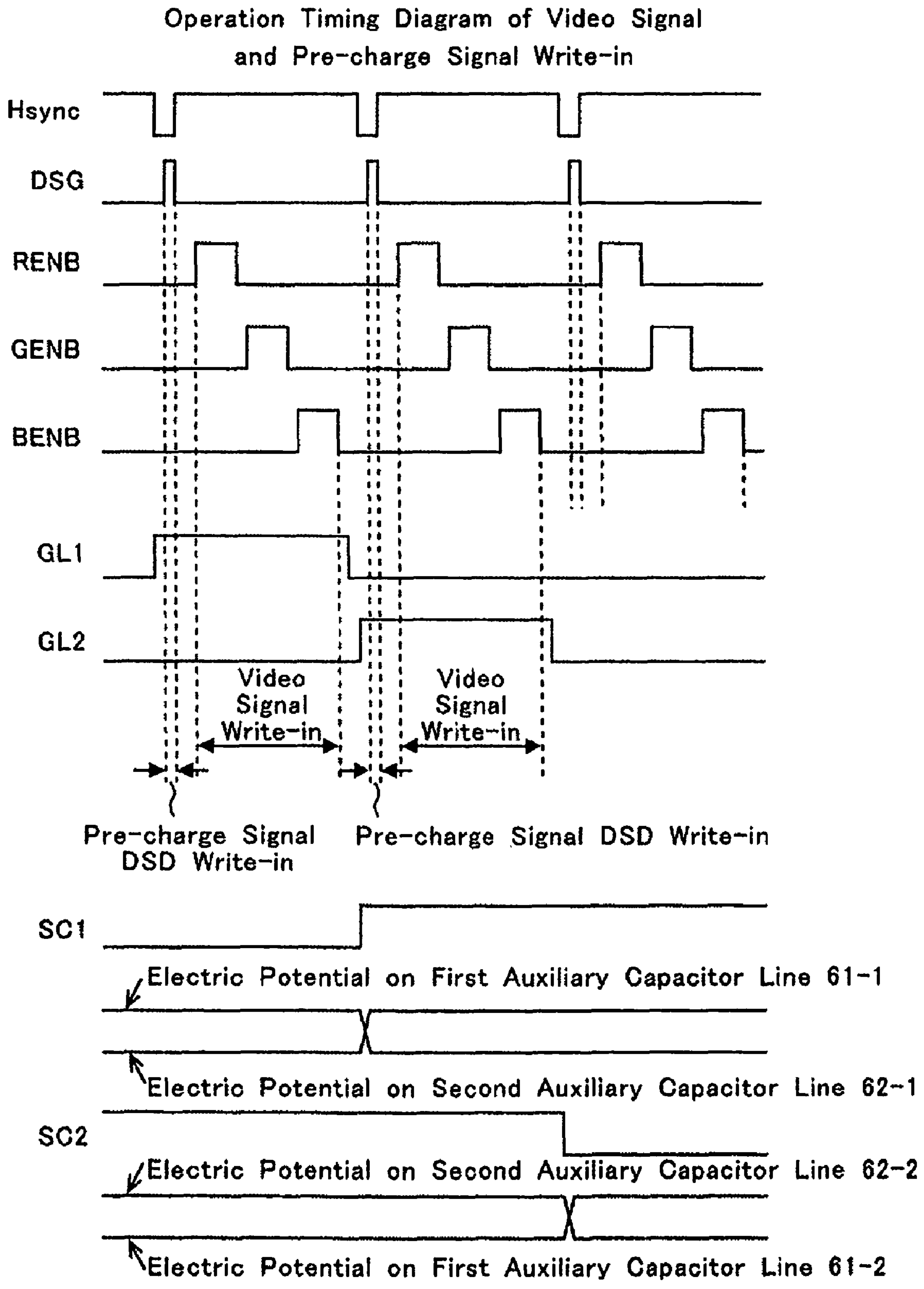
FIG. 3 is a timing diagram showing horizontal scanning in the active matrix type liquid crystal display device according to the embodiment of this invention.
Figure 4:
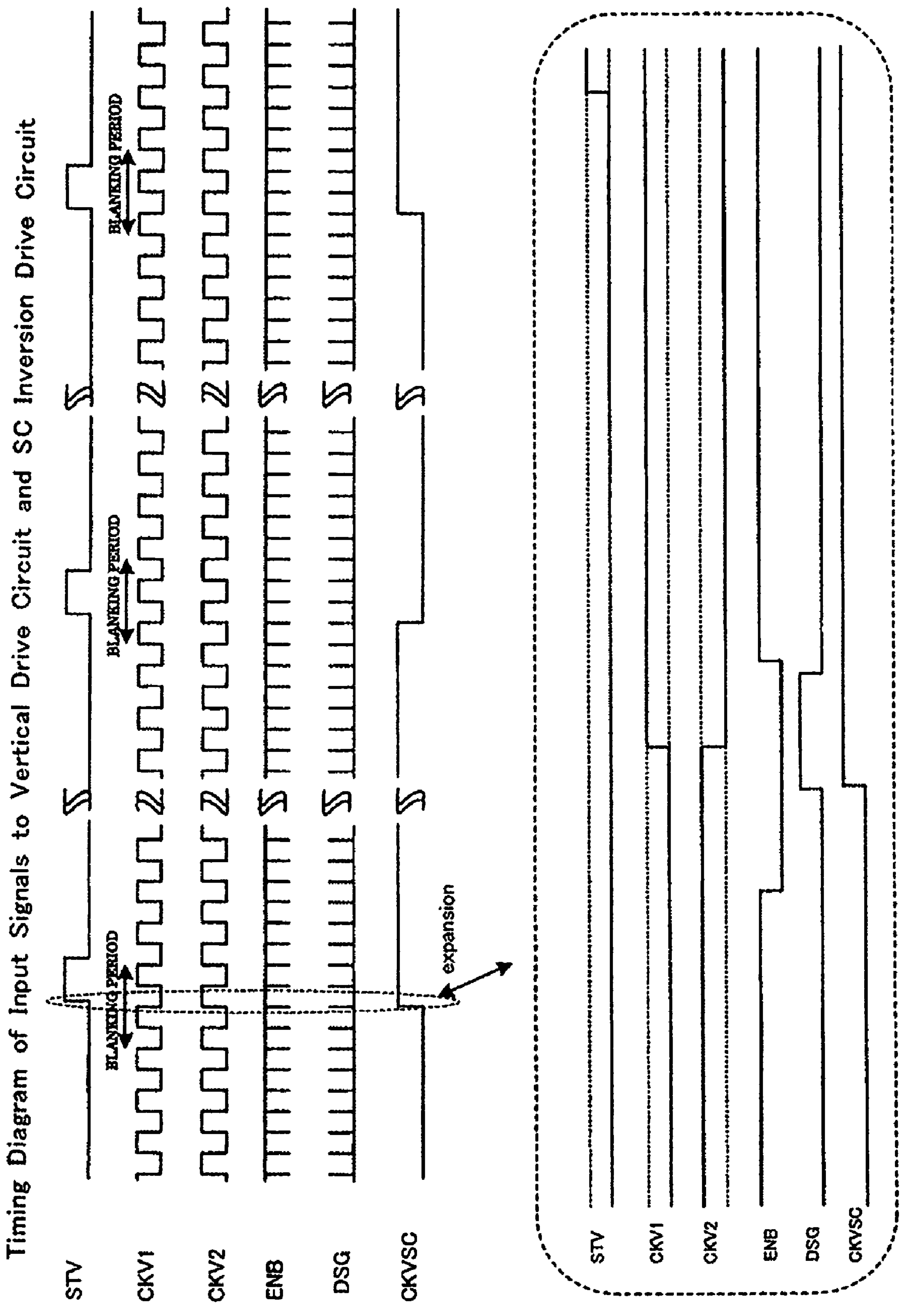
FIG. 4 is a timing diagram showing input signals to the vertical drive circuit 50 and the SC inversion drive circuit in the active matrix type liquid crystal display device according to the embodiment of this invention.
Figure 5:
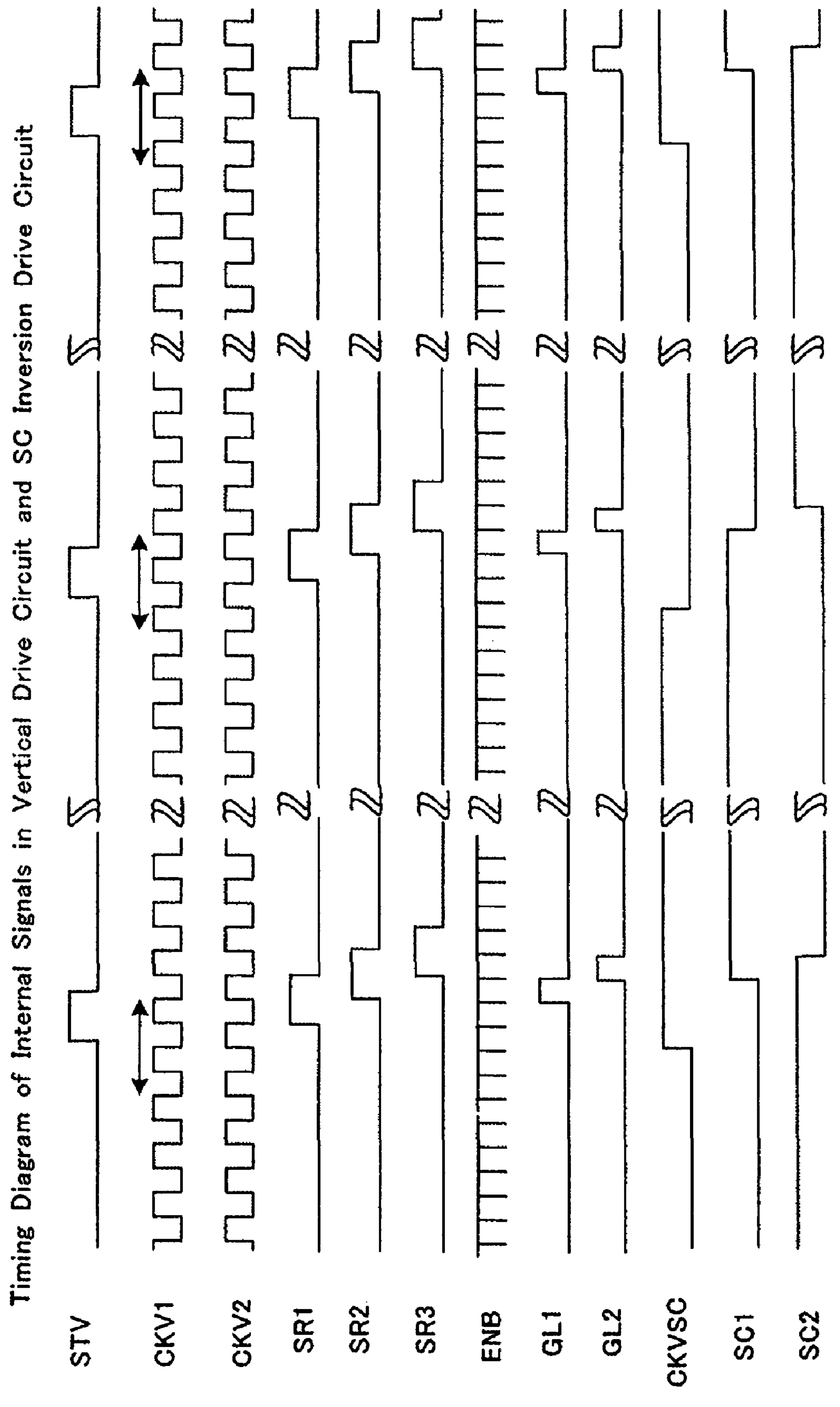
FIG. 5 is a timing diagram showing internal signals in the vertical drive circuit 50 and the SC inversion drive circuit in the active matrix type liquid crystal display device according to the embodiment of this invention.

FIG. 3 is a timing diagram of horizontal scanning to explain write-in operation of the pre-charge signal DSD and the video signals into the pixels. FIGS. 4 and 5 are timing diagrams of vertical scanning. To be more specific, FIG. 4 is a timing diagram showing input signals to the vertical drive circuit 50 and SC inversion drive circuit 70, and FIG. 5 is a timing diagram showing internal signals in the vertical drive circuit 50 and the SC inversion drive circuit 70.

When the first gate signal GL1 rises to a high level, the switching TFT 11 in each of the pixels in the first row is turned on. The pre-charge control signal DSG is pulse-outputted according to a horizontal synchronization signal Hsync and the pre-charge signal DSD is written into the drain lines 20-1, 20-2, 20-3, . . . . After that, when the red video signal enable signal RENB is pulse-outputted, the first video switch 31 is turned on and the red video signal is outputted from the signal lines S1, S2, . . . to the drain line 20-1 and written into the corresponding red pixel GS11 through the switching TFT 11.

After that, when the green video signal enable signal GENB is pulse-outputted, the second video switch 32 is turned on and the green video signal is outputted from the signal lines S1, S2, . . . to the drain line 20-2 and written into the corresponding green pixel GS12 through the switching TFT 11. After that, when the blue video signal enable signal BENB is pulse-outputted, the third video switch 33 is turned on and the blue video signal is outputted from the signal lines S1, S2, . . . to the drain line 20-3 and written into the corresponding blue pixel GS13 through the switching TFT 11.

When the first gate signal GL1 falls and the second gate signal GL2 that corresponds to the next gate line rises, the inversion control signal SC1 from the SC inversion control unit 71 rises to the high level and the electric potential at the first auxiliary capacitor line 61-1 is turned into the low level (VSS) and the electric potential at the second auxiliary capacitor line 62-1 is turned into the high level (VSCH) accordingly. With this, an electric potential at the pixel electrode 12 in the pixel GS11 is changed toward a negative polarity by capacitive coupling through the first auxiliary capacitor 15 and an electric potential at the pixel electrode 12 in the adjacent pixel GS12 is changed toward a positive polarity by capacitive coupling through the second auxiliary capacitor 16, as shown in FIG. 6. In the dot inversion driving, the video signals supplied from the horizontal drive circuit 30 to the neighboring pixels GS11 and GS12 are opposite in polarity to each other.

The operation described above is regarding the first row. The operation regarding the second row is similar. However, polarities of the inversion control signal SC2 from the SC inversion control unit 72 and the electric potentials at the first auxiliary capacitor line 61-2 and the second auxiliary capacitor line 62-2 are opposite to those in the first row, as shown in FIG. 3.

Figure 7:
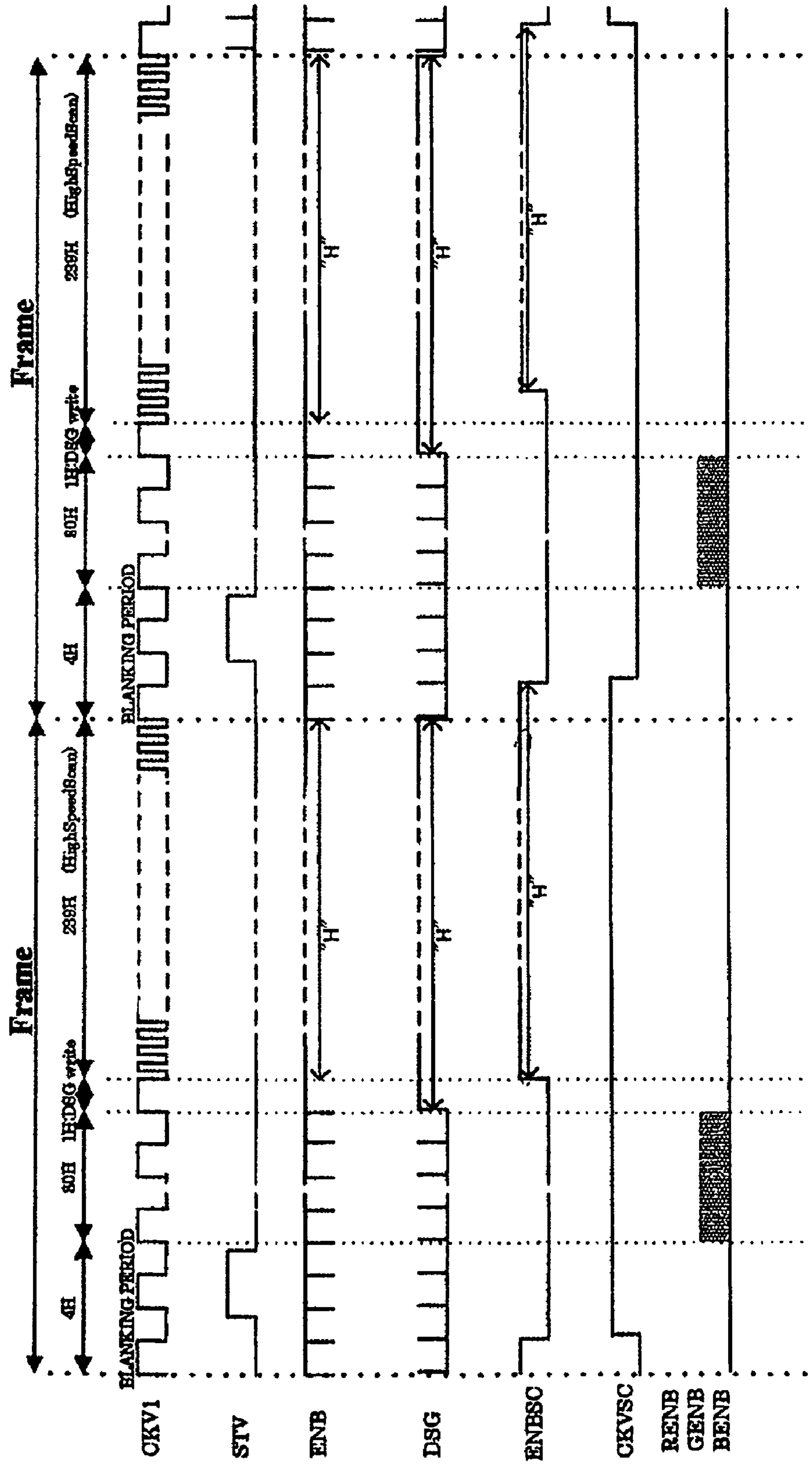
FIG. 7 is a timing diagram showing operation of the active matrix type liquid crystal display device according to the embodiment of this invention.
Figure 8:
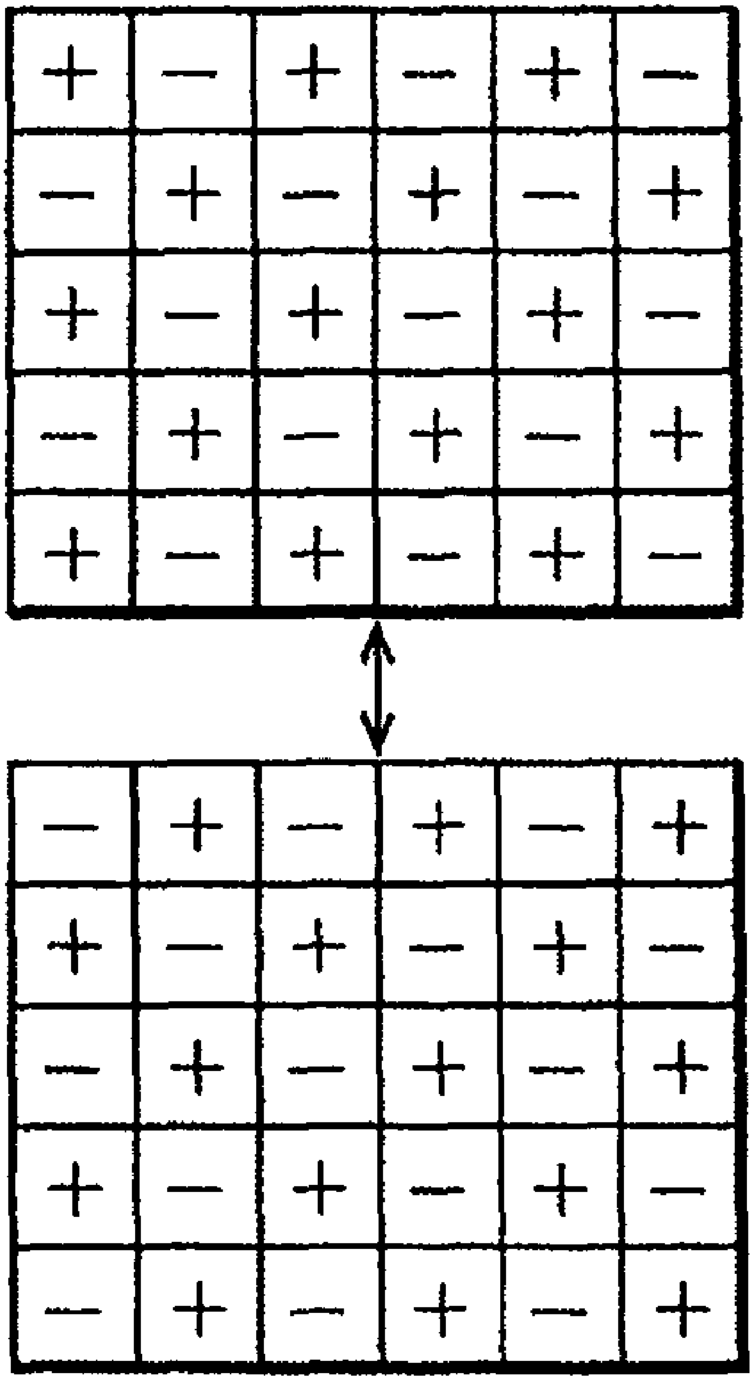
FIG.8 PRIOR ART
FIG. 8 shows the dot inversion driving of an active matrix type liquid crystal display device.

With the SC inversion drive, it is possible to reduce the power consumption in the horizontal drive circuit by reducing the difference in the electric potentials between the positive and negative polarities of the video signal. However, the SC inversion itself is accompanied by the power consumption. Therefore, further reduction in the power consumption is realized by halting the SC inversion drive in the background display area 10B. The halting of the SC inversion drive is explained referring to FIG. 7.

In one frame period, the display area corresponding to first 80 horizontal periods, that is the first line through the 80th line, is set as the partial display area and the display area corresponding to the remaining 240 lines is set as the background display area in this embodiment. And the partial display area control signal ENBSC is set at the low level and the SC inversion drive as described above is performed in the partial display area 10P. The partial display area control signal ENBSC is fixed at the high level in the background display area 10B and all of the SC inversion control units 71 and 72 corresponding to the background display area 10B halt the operation.

At that time, although each of the pixels in the background display area 10B may be provided with the background display signal from the horizontal drive circuit 30, it is preferable that the pre-charge control signal DSG is fixed at the high level and the pre-charge signal DSD is supplied as the background display signal. The operation of the horizontal drive circuit 30 can be halted and the power consumption can be further reduced by doing so. The background display signal is a low voltage signal of about IV with reference to a constant electric potential at the common electrode 13, that causes white display on a normally-white liquid crystal display device or black display on a normally-black liquid crystal display device.

Also, it is preferable that a frequency of the vertical clocks CKV1 and CKV2 in the background display area 10B is higher than a frequency of the vertical clocks CKV1 and CKV2 in the partial display area 10P. That is because fast write-in is possible in the background display area 10B, since the same color signal is continuously written-in and thus there is no need for consideration on a rise time of the video signal, which is required in the partial display area 10P. As a result, assuming a frame rate is same as in the conventional art, faster display operation in the background display area 10B allows slower write-in operation of the video signals in the partial display area 10P accordingly, thus the power consumption can be reduced furthermore.

The power consumption can be further reduced by fixing the output enable signal ENB that is inputted to the vertical drive circuit 50 at the high level in the background display area 10B. No consideration is required for mutual interference among the gate signals (GL1 and GL2, for example) outputted to the adjacent gate lines and the video signal outputted to the drain line, since the same color signal is continuously written into the pixels in the background display area as described above. As a result, fixing the output enable signal ENB at the constant level is made possible to further reduce the power consumption.

According to this invention, the power consumption in the active matrix type liquid crystal display device having partial display function can be reduced.

What is claimed is:

1. An active matrix type liquid crystal display device configured to display images as a series of frames and configured to operate under a normal display mode and a partial display mode, comprising:

a plurality of pixels arranged in a matrix form comprising rows and columns;

a pixel electrode disposed in each of the pixels;

a common electrode;

a liquid crystal layer disposed between the common electrode and the pixel electrodes;

a switching device disposed in each of the pixels, receiving a gate signal and connected with a corresponding pixel electrode;

a vertical drive circuit outputting the gate signals to the switching devices based on a vertical clock;

a first auxiliary capacitor line and a second auxiliary capacitor line that are disposed along each row of the matrix;

an auxiliary capacitor line inversion drive circuit that performs an inversion drive to invert electric potentials at the first and second auxiliary capacitor lines at a predetermined interval so that the electric potentials at the first and second auxiliary capacitor lines are opposite in phase to each other;

a plurality of first auxiliary capacitors connected with the first auxiliary capacitor line and a plurality of second auxiliary capacitors connected with the second auxiliary capacitor line, each of the pixel electrodes being connected with one of the first auxiliary capacitors or one of the second auxiliary capacitors; and a horizontal drive circuit that under the partial display mode provides each of pixels selected according to a partial display area control signal with an image signal that is supplied to a corresponding pixel electrode through a corresponding switching device, wherein under the partial display mode the auxiliary capacitor line inversion drive circuit is configured to perform the inversion drive for the selected pixels and halt the inversion drive for pixels not selected by the partial display area control signal over two or more consecutive frames, and each of the pixels includes a first auxiliary capacitor or a second auxiliary capacitor and does not include both of the first and second auxiliary capacitors.

2. The active matrix type liquid crystal display device of claim 1, wherein under the partial display mode the horizontal drive circuit provides each of the unselected pixels with a background display signal.

3. The active matrix type liquid crystal display device of claim 1, further comprising a plurality of drain lines connected with the pixels and a pre-charge circuit that provides the drain lines with a pre-charge signal, wherein under the partial display mode the pre-charge circuit provides each of the unselected pixels with the pre-charge signal as a background display signal.

4. The active matrix type liquid crystal display device of claim 3, wherein under the partial display mode the horizontal drive circuit provides no image signal to any of the unselected pixels.

5. An active matrix type liquid crystal display device configured to display images as a series of frames and configured to operate under a normal display mode and a partial display mode, comprising:

a plurality of pixels arranged in a matrix form comprising rows and columns;

a pixel electrode disposed in each of the pixels;

a common electrode;

a liquid crystal layer disposed between the common electrode and the pixel electrodes;

a switching device disposed in each of the pixels, receiving a gate signal and connected with a corresponding pixel electrode;

a vertical drive circuit outputting the gate signals to the switching devices based on a vertical clock;

a first auxiliary capacitor line and a second auxiliary capacitor line that are disposed along each row of the matrix;

an auxiliary capacitor line inversion drive circuit that performs an inversion drive to invert electric potentials at the first and second auxiliary capacitor lines at a predetermined interval so that the electric potentials at the first and second auxiliary capacitor lines are opposite in phase to each other;

a plurality of first auxiliary capacitors connected with the first auxiliary capacitor line and a plurality of second auxiliary capacitors connected with the second auxiliary capacitor line, each of the pixel electrodes being connected with one of the first auxiliary capacitors or one of the second auxiliary capacitors; and a horizontal drive circuit that under the partial display mode provides each of pixels selected according to a partial display area control signal with an image signal that is supplied to a corresponding pixel electrode through a corresponding switching device, wherein under the partial display mode the auxiliary capacitor line inversion drive circuit is configured to perform the inversion drive for the selected pixels and halt the inversion drive for pixels not selected by the partial display area control signal over two or more consecutive frames, and a frequency of the vertical clock for the unselected pixels is higher than a frequency of the vertical clock for the selected pixels.

6. The active matrix type liquid crystal display device of claim 1, wherein the vertical drive circuit comprises a plurality of shift register units connected in series and sequentially transferring a vertical start signal according to the vertical clock and an AND circuit to which an output of a first shift register unit of the plurality of shift register units, an output of a second shift register unit of the plurality of shift register units, the second shift register unit being adjacent the first shift register unit, and an output enable signal are inputted, and a level of the output enable signal is fixed so that the gate signal can be outputted for the unselected pixels.

7. The active matrix type liquid crystal display device of claim 1, wherein the horizontal drive circuit provides each pair of pixels that are next to each other in a row of the matrix with image signals that have opposite phases.

8. The active matrix type liquid crystal display device of claim 1, wherein, under the partial display mode, the first auxiliary capacitor line connected to corresponding pixels not selected by the partial display area control signal and the second auxiliary capacitor line connected to corresponding pixels not selected by the partial display area control signal are kept at a constant electrical potential.

* * * * *